United States Patent [19]

Ito et al.

[11] Patent Number: 4,945,201
[45] Date of Patent: Jul. 31, 1990

[54] RACK MOUNTABLE WELD CONTROLLER

[75] Inventors: Roy A. Ito, Woodland Hills; Wen-Tar Kuo, Chatsworth, both of Calif.

[73] Assignee: Pertron Controls Corporation, Chatsworth, Calif.

[21] Appl. No.: 354,509

[22] Filed: May 19, 1989

[51] Int. Cl.$^5$ ............................................. B23K 11/24
[52] U.S. Cl. ...................................... 219/110; 219/114
[58] Field of Search ...................... 219/108, 110, 114

[56] References Cited

U.S. PATENT DOCUMENTS 4,301,351 11/1981 Mathews .............................. 219/110
4,628,176 12/1986 Kojima et al. ...................... 219/110

*Primary Examiner*—Clifford C. Shaw
*Attorney, Agent, or Firm*—Eric S. Hyman; Michael J. Femal

[57] ABSTRACT

A rack mountable weld controller for use as a plug in card within a rack of a programmable logical controller (PLC) system. All signals between the PLC and the weld controller are through the backplane of the rack in which the weld controller is installed. In this manner, the large number of signals which are needed to operate the weld controller may be passed through the backplane rather than over a set of cables connecting the weld controller to an input card and output card which are themselves plugged into a backplane slot.

9 Claims, 3 Drawing Sheets

RACK MOUNTABLE WELD CONTROLLER

BACKGROUND OF THE INVENTION

The present invention is in the field of programmable logic controller (PLC) systems which control a wide variety of manufacturing processes. A typical configuration is shown in FIG. 1, and comprises a power supply 11 which supplies power to a processor 13 which is coupled to an address bus 20, a data bus 22 and control bus 24, each of which are coupled to individual controller slots 15. As shown in FIG. 1, a single processor or PLC typically accesses up to 16 controller cards coupled directly thereto through a backplane 31, each of which is plugged into one of the controller slots 15. The controller cards themselves interface, for example, external apparatus such as robots on an assembly line through input cards for receiving signals from the robots and output cards for generating signals which control the operation of the robots through a feedback control loop. Another type of external apparatus which may be controlled by a PLC is a resistance welding machine which is itself controlled by a controller such as that disclosed in U.S. Pat. No. 4,456,809. However, such weld controllers are typically stand alone units or if coupled to a PLC, then such coupling is through a set of cables which are then connected to an input card and an output card which are mounted in a slot.

SUMMARY OF THE INVENTION

The present invention is directed to a programmable logical controller (PLC) system incorporating a rack mountable weld controller. All signals between the PLC and the weld controller are through the backplane of the rack in which the weld controller is installed. In this manner, the large number of signals which are needed to operate the weld controller may be passed through the backplane rather than over a set of cables connecting the weld controller to an input card and output card which are themselves plugged into a backplane slot. In this manner, a weld controller may be installed in a minimum amount of time at great cost savings as compared with prior art techniques.

DETAILED DESCRIPTION OF THE INVENTION

The present invention is directed to a programmable logic controller (PLC) used in factory automation systems.

Figure 1:
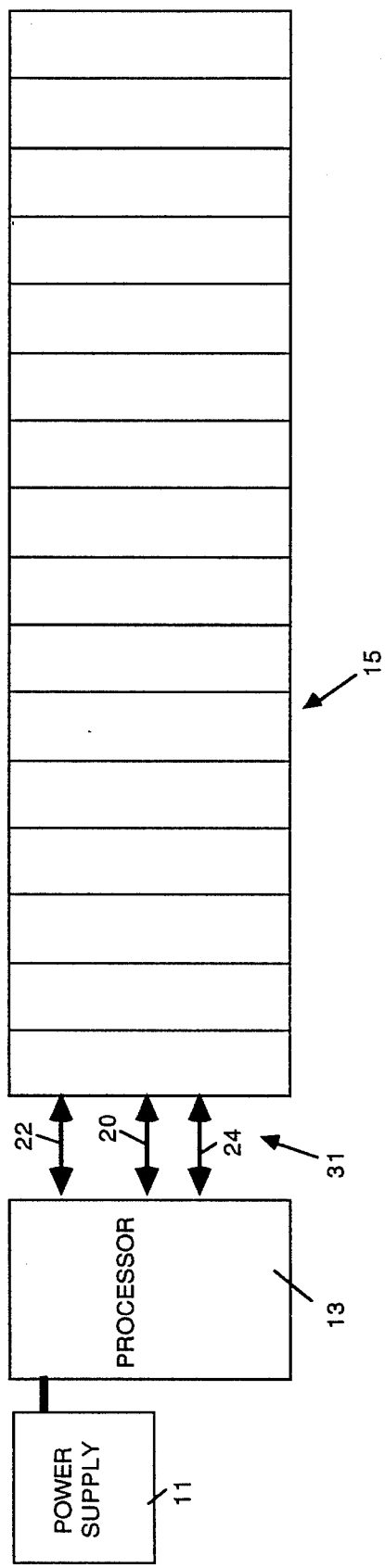
FIG. 1 is a block diagram showing the overall arrangement of a PLC and its associated controller card slots.

As shown in FIG. 1, a PLC system comprises a power supply 11, a processor or PLC 13, and a plurality of peripheral card slots 15 into which desired peripheral cards are inserted. For example, as shown in FIG. 1, 16 slots are available for peripheral controller cards such that in any one PLC system, from 1 to 16 peripheral cards may be accessed by the PLC 13. Such a PLC system configuration is installed in a rack which may be linked to additional racks, either directly or over a communications link. In particular, a single PLC may be coupled directly to peripheral cards through physical backplane connections in a local rack or from a serial communications link accessing remote racks to communicate with each peripheral card to which the PLC is coupled. The back plane 31 of the rack includes an address bus 20, a data bus 22 and a control bus 24 accessible by each controller card in any one of the 16 slots. The PLC controls peripheral cards in other racks within the same cabinet via local rack adapters and in remote racks linked to the local rack via cluster controllers as is well known in the art.

Figure 2:
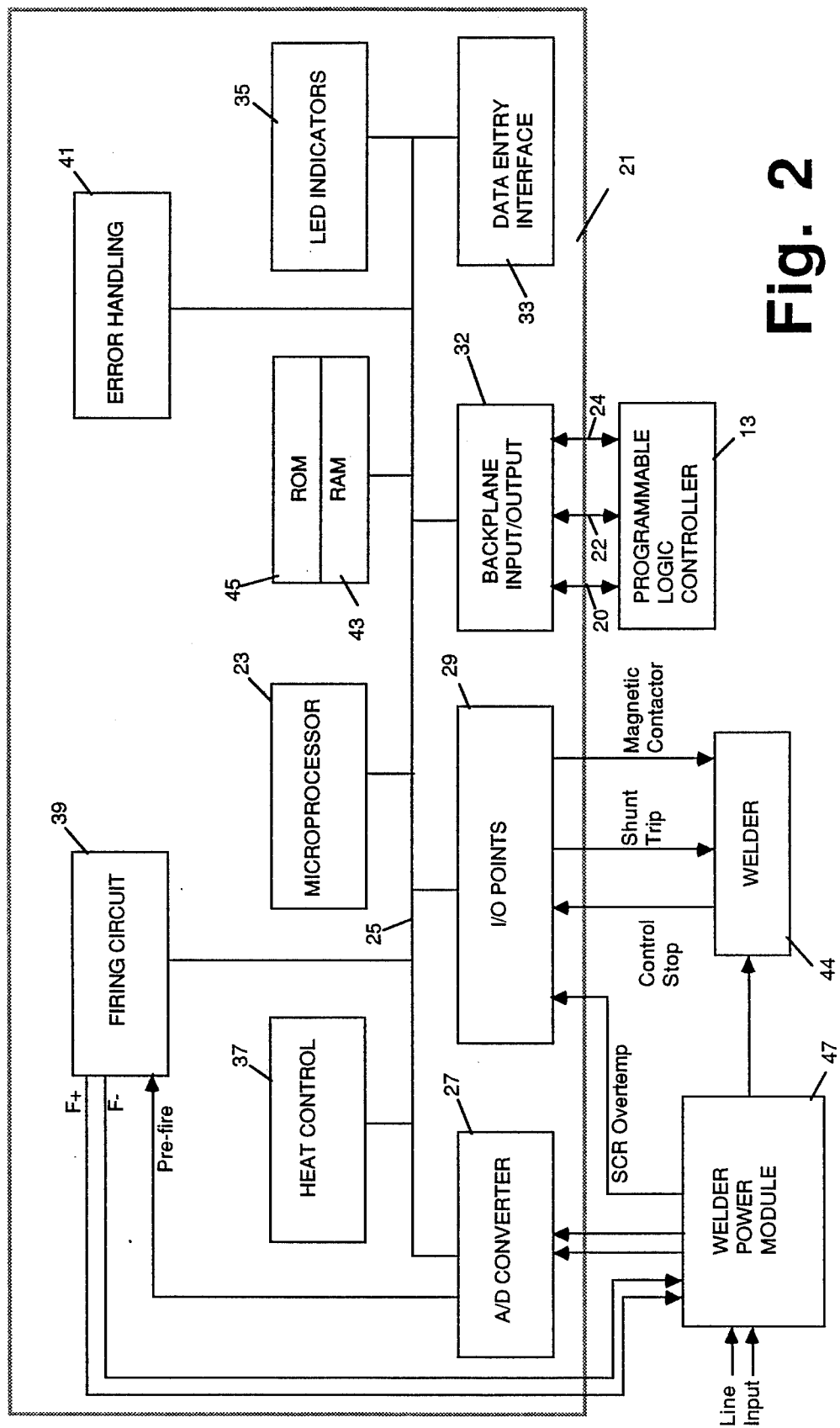
FIG. 2 is a block diagram of the invented rack mountable weld controller.

Referring now to FIG. 2, a block diagram of the invented rack mountable weld controller (RMWC) is shown. The invented RMWC may be plugged into a single slot 15 of a PLC system and thus is accessed like any other peripheral card installed in a local rack or remote rack. In this connection all communications between the PLC and the RWMC are through the back plane. In particular, RWMC 21 comprises a microprocessor 23 such as a Motorola 6809 which is coupled via a bus 25 to A/D converter 27, I/0 points 29, back plane input/output 32, data entry interface 33, LED indicators 35, heat control 37, firing circuit 39, error handling 41, and memory comprising RAM 43 and ROM 45. Timing and control signals needed for proper operation of microprocessor 23 are of the usual type, the details of which should be apparent to persons skilled in the art. Associated with a RMWC is a welder power module 47 and welder 48. RMWC outputs to welder 48 are shunt trip and magnetic contactor signals and a control stop signal is input to the RMWC from welder 48.

To the PLC, each RMWC appears as a set of input and output points. A ladder program used by the PLC generates initiate signals, accepts individual weld in progress and fault signals from each RMWC and generates a single weld complete signal after the weld. The PLC can also generate initiate signals for other groups of RMWCs if cascade firing is used and can produce a weld complete after all of the cascade firing has been completed. The weld complete signal is synthesized by performing a logical AND on the weld completes from each of the RMWCs forming a group. Closed loop control of the welding process is performed by a program stored in ROM 45 which controls the operation of microprocessor 23. A suitable program for this purpose may be found in U.S. Pat. No. 4,516,008 which issued May 7, 1985.

In addition to the SCR overtemperature signal, each RMWC 21 is connected to a corresponding welder power module 47 via six low voltage connections. These other connections are to carry two firing signals generated by firing circuit 39, and two analog signals (using two wires each) which are input to A/D converter 27. Details regarding these signals will be described below in connection with the descriptions of firing circuit 39 and welder power module 43.

A/D converter 27 comprises a two channel analog to digital converter which converts analog signals from welder power module 47 to 8-bit digital signals which represent power line voltage and welding transformer primary current. The digitized signals are placed onto bus 25 and stored in the RAM portion of memory 43 for use by the software in the ROM 45 and form the feedback used by the program. Programmable counters used by the A/D converter also generate a prefire signal which is input to firing circuit 39. Additionally, and enable fire signal is generated when the software recognizes the need to "arm" the firing process—to turn off a safety feature which inhibits the ability to fire—just prior to firing itself. Enable fire amounts to a time window within which firing can take place." In theory, the use of enable fire is intended to make erroneous firing due to a software "hang-up" unlikely, as two actions are needed to fire (prefire and enable fire). Implementation details regarding A/D converter 27 and the programmable counters used to generate the prefire signal should be apparent to persons skilled in the relevant art and therefore will not be described herein.

I/0 points 29 comprise two inputs and two dry-contact outputs which are dedicated to specific purposes and cannot be reassigned. One input which is coupled to welder power module 47 monitors SCR overtemperature. SCR overtemperature is a connection between a RMWC and its corresponding welder power module. This input is monitored every cycle, and if it is activated, the welding current is disabled; and a "SCR overtemp" error is generated. The second input monitors control stop which is a signal generated by an isolation relay within welder 48 when an operator or external device causes an electrical contact to open.

The electrical contact is usually a palm button controlling a normally closed contact switch. Depressing this button indicates a possible emergency condition which could cause damage to the machine or to the workpiece. This input is monitored every cycle. If this input is turned off, the weld is aborted immediately. All valves, programmed outputs and the magnetic contractor output are turned off, and a Control Stop error is generated.

The two outputs comprise a shunt trip signal and a magnetic contactor signal. The shunt trip signal is placed on a line which is coupled to a circuit breaker within welder 48 and is generated when a "SCR short" error is detected. More particularly, a SCR short error is generated when uncommanded current flow is detected. The shunt trip signal is a one second long pulse which is generated if power is still on. If the welder has a magnetic contactor, the magnetic contactor signal is placed on a line which is coupled to a magnetic contactor actuator coil through an interposing control relay within welder 48 and is generated when a welding sequence is begun.

In PLCs utilizing multiple RMWCs, the shunt trip outputs of each RWMC are tied in parallel so that any of the RMWCs can cause a shunt trip. The magnetic contactor outputs are also wired in parallel for the same reason. Similarly, the control stop inputs are wired in parallel and fed from a single contact of an isolation relay within each bank of welder power modules.

Backplane input/output 31 comprises a set of three 16-bit registers which store the various inputs and outputs between PLC 13 and RMWC 21. The three 16-bit registers store the following signals:

| Register 1: (Input - from PLC to RMWC) |
|---|
| BIT DESCRIPTION |
| 1: control stop |
| 2: magnetic contactor |
| 3-8: reserved |
| 9: schedule select 1 |
| 11: schedule select 2 |
| 12: schedule select 8 |
| 13: odd parity |

-continued

| Register 1: (Input - from PLC to RMWC) |
|---|
| BIT DESCRIPTION |
| 14: stepper reset |
| 15: reserved |
| 16: weld/no weld |

| Register 2: (Input - from PLC to RMWC) |
|---|
| BIT DESCRIPTION |
| 1: programmable Input #6 |
| 2-8: not used |
| 9: weld permit |
| 10: fault reset |
| 11: programmable input #1 |
| 12: reserved |
| 13: programmable input #2 |
| 14: programmable input #3 |
| 15: programmable input #4 |
| 16: programmable input #5 |

| Register 3: (Output - from RMWC to PLC) |
|---|
| BIT DESCRIPTION |
| 1: valve #4 |
| 2: programmable output #5 |
| 3: programmable output #6 |
| 4: programmable output #7 |
| 5: programmable output #8 |
| 6: end of squeeze |
| 7: weld in progress |
| 8: reserved |
| 9: valve #1 |
| 10: valve #2 |
| 11: valve #3 |
| 12: weld/no weld |
| 13: fault |
| 14: alert |
| 15: reserved |
| 16: reserved |

Of course, the foregoing assignments are arbitrary and may be modified according to the particular PLC being used. A fourth register is reserved for each RMWC module, and additional registers can be added as required. The PLC reads the registers sequentially at the end of each ladder cycle, one register at a time, and uses the same data and address lines on the back plane to read all registers.

Functional Description of Signals Between RMWC and PLC

Control Stop Input (Register 1, bit 01)

Weld is aborted immediately if this input is off; and "control stop" error is generated. To allow initiation, this input must be turned on and the "control stop" error must be reset.

Control Initiation Inputs (Register 1, bits 09 through 13)

These five inputs are used to control initiation. Four are used to select one of 15 schedules and the fifth is an odd parity input. Initiation is armed whenever the schedule selects are all off. Once armed, a schedule is selected and initiated by simultaneously setting the four selects such that a number from 1 to 15 generated with the parity input turned on or off, as necessary, to create odd parity with respect to the selects which have been turned on. All of the inputs must be stable within 50 milliseconds of the first off-to-on transition of the weld schedule. If in repeat mode, the schedule will continuously repeat as long as the five inputs remain the same. When schedule execution is completed, the schedule selects must all be turned off to enable execution of a new schedule.

Stepper Reset Input (Register 1, bit 14)

When this input is turned on, all of the weld made counts of steppers will be reset to 0.

Weld/No Weld Input (Register 1, bit 16)

This input must be on to allow welding current. When it is off, the control will sequence normally without passing current and the stepper weld made count will not be incremented and a "Control in no weld" error is generated. The no weld mode is used for several reasons. It allows the machine associated with the welding control to perform all of its functions without passing current, which is desirable when setting up. Also, if a machine is used to weld several similar, but not identical workpieces, such as car body parts (e.g. Buicks and Cadillacs on same machine), it is desirable to use the same PLC program, but to not make some welds. This can be done by putting the control in no weld for parts not requiring particular welds. Because the control passes no welding current while it is in the no weld mode, an error must be reported so that the operator will be aware and accidental no weld situations can be avoided. The error can be ignored or turned off if the operators chooses to do so.

Weld Permit Input (Register 2, bit 09)

This input must be off in order for the control to sequence beyond the "Squeeze" instruction. The control pauses indefinitely until this input is off.

Fault Reset (Register 2, bit 10)

This input requires an off-to-on transition in order to reset faults.

Programmable Inputs #1-#5 (Register 2, bits 01,11, 13-15)

These inputs are utilized in the "Wait for input on/off" instructions.

Magnetic Contactor Input (Register 1, bit 2)

This input controls the magnetic contactor output of the RMWC. When this input is on, the RMWC's magnetic contactor output is turned on. Similarly, when this input is off, the RMWC's magnetic contactor output is turned off.

Valve Outputs (Register 3, bits 01, 9-11)

Four valve outputs are provided which are controlled in the "Squeeze", "Output On", and "Output Off" instructions.

Weld/No Weld Output (Register 3, bit 12)

This output reflects the weld state of the control. If the control is in weld, this output will be on. If any of the weld/no weld inputs are in the no-weld state or if a fault which causes a disweld has occurred, then this output will be off.

Fault Output (Register 3, bit 13)

This output is turned off if the control detects any fault condition and turned on when it is cleared.

Alert Output (Register 3, bit 14)

This output is turned on when the control detects any alert condition and turned off when it is cleared.

Programmable Outputs #5-#8 (Register 3, bits 2-5)

These outputs are controlled by the "Squeeze", "Output on", and "Output off" instructions during weld schedule execution. The particular output number desired is specified in each step which affects output operation. All programmable outputs ar turned off by the "Hold" instruction, and when a schedule is halted.

End of Squeeze Output (Register 3, bit 6)

This output is turned on after the squeeze delay in the "Squeeze" instruction. It is turned off at the beginning of the "Hold" instruction (before hold delay).

Weld in Progress Output (Register 3, bit 7)

This output is turned on when Weld Permit Input is turned off during a "Squeeze" instruction. It is turned off at the beginning of the "Hold" instruction (before hold delay).

Data entry interface 33 comprises a RS-485, 19.2 K. baud multidrop interface which receives data entered by an operator through a data entry panel (DEP) such as that which is described in U.S. Pat. No. 4,456,809 which issued June 26, 1984. See especially FIGS. 2 and 3a-3c. Data entry interface 33 also includes a switch (e.g., 8 position DIP to allow 256 unique addresses) which is used to identify a specific RMWC for communicating with the DEP since a single DEP may be coupled to multiple RMWCs. The data input via the DEP such as schedule and stepper information used by the program in ROM 45 is stored in RAM 43.

LED indicators 35 comprise a set of eight LEDs which are used to display the status of the welding process, communications from the DEP, and from the welder power module. The eight LEDs are as follows:

Sync with Welder Power Module (LED 0)

This LED is illuminated when the RMWC acknowledges the proper welding power source (i.e., 60 Hz or 50 Hz).

Data Entry Panel (DEP) Communication (LED 1)

This LED blinks when there is a active communication between the RMWC and the DEP.

Fault (LED 2)

This LED is illuminated when a "fault" error occurs.

Alert (LED 3)

This LED is illuminated when an "alert" error occurs.

SCR Overtemperature (LED 4)

This LED is illuminated when SCR over-temperature input is on.

Shunt Trip (LED 5)

The LED is illuminated when the shunt trip output is activated.

Magnetic Contactor (LED 6)

This LED is illuminated when the magnetic contactor output is turned on.

SCR Firing On (LED 7)

This LED is illuminated when SCR firing pulse signal is generated.

Heat control 37 is actually a portion of the program in ROM 43 which uses the data generated by A/D converter 27 as follows.

a) When the control is first powered up, it loads a "safe" firing angle value from ROM. Depending on the power factor ($100\cos\theta$) of the secondary load, there is a minimum firing angle which can be used without causing half-cycling. A totally safe firing angle is 90°, since an SCR fired into a purely inductive load at 90° would conduct for 180° and would cease to conduct in time for the second SCR firing, which would occur at 270° (90° after the beginning of the second half cycle). In the preferred embodiment, a safe angle of approximately 84° is used, which is safe for power factors as low as 13%, which is lower than will ever be encountered in actual equipment. No matter what heat level is entered by the user for a weld, the first weld after power up begins with a firing angle of 84°. As a result of the first cycle of welding, the software obtains the conduction angle from the conduction angle counters.

b) From the conduction angle, the coast/drive factor is calculated:

drive angle = 180° − firing angle
coast angle = conduction angle − drive angle c) Two tables (referred to here as "Table 1" and "Table 2") are utilized by the software. Using the coast/drive factor as the index, the software uses Table 1 to obtain the R/L Variation Compensation Factor (RVCF).

d) Next, the Line Voltage Variation Compensation Factor (LVCF) is calculated. This is just the nominal line voltage (default or user set value) divided by the measured line voltage.

e) Calculated Heat is determined by multiplying the user heat setting by the RVCF and by the LVCF.

f) Using the Calculated Heat as the index, the software obtains a new firing angle from Table 2. This firing angle results in a conduction angle, ... and the process repeats (go to step b). Tables 1 and 2 contain data that was originally calculated, then modified empirically to compensate for simplifications in the calculations. The Tables, as well as the program itself, may be determined by the disclosure of U.S. Pat. No. 4,516,008 as noted above.

Figure 3:
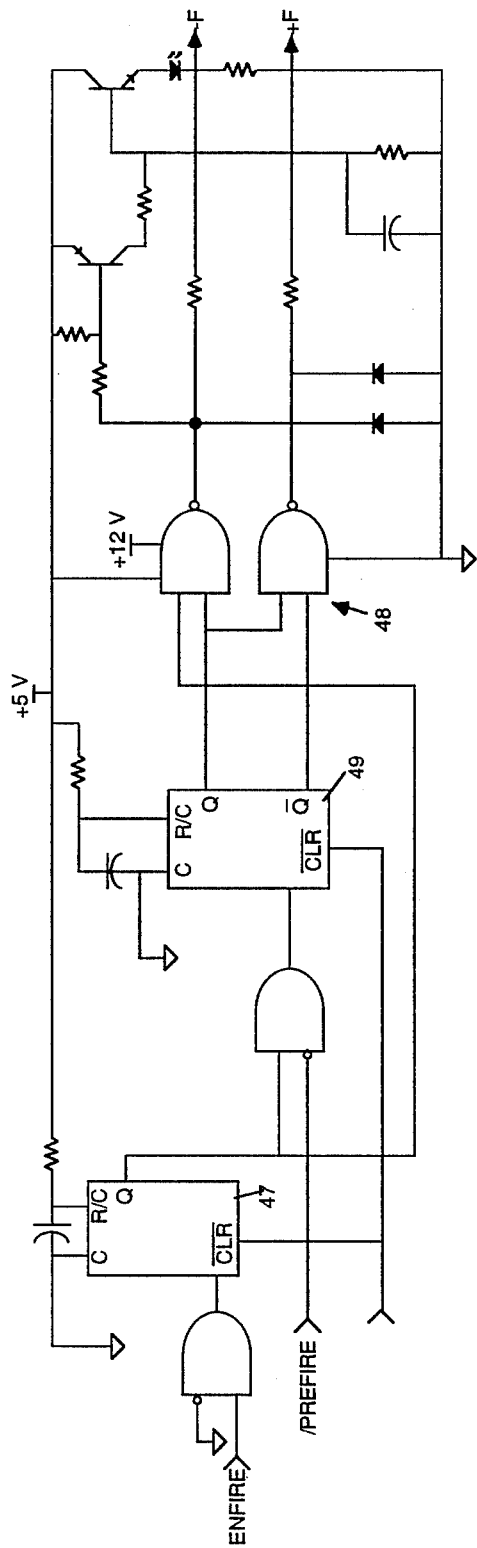
FIG. 3 is a schematic diagram of firing circuit 39.

Firing circuit 39 uses the Prefire signal generated by the counters also used by A/D converter 27 and an enable fire (Enfire) signal generated by the program in ROM 43 when the software is preparing to begin the flow of welding current (Enfire turn on), and at the exact time that an SCR gating pulse should be generated (Prefire turned on) to generate a positive (+F) and negative (−F) firing signals used which are input to welder power module 47. The details of firing circuit 39 are shown in FIG. 3 which operates as follows.

The Enfire signal occurs first, and results in the triggering of the first oneshot (monostable multivibrator) 47. This first oneshot has a pulse duration of approximately one millisecond.

The output of the first oneshot is also applied as an enabling signal to the output drivers 48 which apply the pulse to the firing board.

When the Prefire pulse leading edge arrives, the second oneshot 49 is triggered if and only if the first oneshot is still triggered. The second oneshot produces a short (70µS) pulse which, via the output drivers, is applied to the firing board in the power module.

Error handling 41 is also a portion of the program in ROM 43. The particulars of the functions handled by this programming should be apparent from the description of the signals between PLC 13 and RMWC 21 and the description of LED indicators 35 above.

RAM 43 is a 32 K. byte static RAM. ROM 45 is typically a 32 K. byte ROM which has been programmed to perform the heat control and error handling functions described above.

Figure 4:
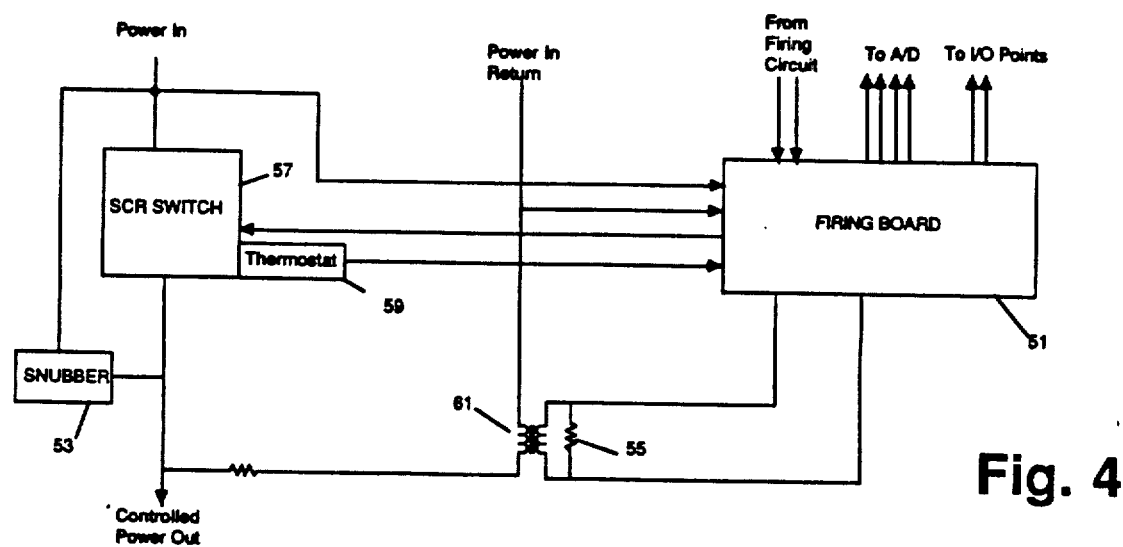
FIG. 4 is a block diagram of welder power module 43.

Referring now to FIG. 4, welder power module 47 comprises a firing board assembly 51, snubber assembly 53, primary damping resister 55, SCR switch assembly, 57, thermostat 59 and current transformer 61. The details regarding these components are well known to persons skilled in the art. A suitable welder power module which may be used in connection with the present invention is available from Square D Corporation as its Pertron part no. 1400581-004.

We claim:

1. A rack mountable weld controller for controlling the operation of a welder having a welder power module for use in a programmable logic controller system including a card adapted for installation in a slot coupled through a backplane to a programmable logic controller, said card comprising:
    a) a microprocessor;
    b) backplane input/output means coupled to said microprocessor and for coupling to said backplane for transferring data between said programmable logic controller and said microprocessor;
    c) input/output means coupled to said microprocessor and for coupling to said welder power module and said welder for transferring control signals between said welder power module, said welder and said microprocessor;
    d) analog to digital converter means coupled to said microprocessor and for coupling to said welder power module for converting power line voltage and welder transformer primary current to digital signals;
    e) means coupled to said microprocessor for generating a prefire signal;
    f) firing circuit means coupled to said prefire signal generating means and said microprocessor and for coupling to said welder power module for generating a firing signal;
    g) means for controlling the operation of said microprocessor.

2. A rack mountable weld controller for controlling the operation of a welder having a welder power module for use in a programmable logic controller system including a card adapted for installation in a slot coupled through a backplane to a programmable logic controller, said card comprising:
    a) microprocessor;
    b) backplane input/output means coupled to said microprocessor and for coupling to said backplane for transferring data between said programmable logic controller and said microprocessor;
    c) input/output means coupled to said microprocessor and for coupling to said welder power module and said welder for transferring control signals between said welder power module, said welder and said microprocessor;
    d) analog to digital converter means coupled to said microprocessor and for coupling to said welder power module for converting power line voltage and welder transformer primary current to digital signals;

e) means coupled to said microprocessor for generating a prefire signal;

f) firing circuit means coupled to said prefire signal generating means and said microprocessor and for coupling to said welder power module for generating a firing signal;

g) memory means for storing a program which performs calculations which enable closed loop control of the operation of the welder by controlling the operation of said microprocessor.

3. The weld controller defined by claim 2 wherein said backplane input/output means comprises at least one register which stores inputs to said weld controller from said programmable logic controller and outputs to said programmable logic controller from said weld controller.

4. The weld controller defined by claim 2 wherein said analog to digital converter means comprises a two channel, eight bit analog to digital converter which converts power line voltage and welding transformer primary current from said welder power module to eight bit digital signals.

5. The weld controller defined by claim 2 wherein said prefire signal generating means comprises a plurality of programmable counters.

6. The weld controller defined by claim 2 wherein said firing circuit means comprises:

a) means for receiving an enable fire signal and said prefire signal, said enable fire signal being generated when said program is preparing to commence initiation of a welding current;

b) means for generating said firing signal when said enable fire request and said prefire request become active simultaneously.

7. The weld controller defined by claim 6 wherein said receiving means comprises:

a) a first monostable multivibrator which generates a first pulse of approximately one millisecond after receipt of said enable fire signal;

b) an AND gate having one input coupled to said first monostable multivibrator and a second input for receiving said prefire signal, said second monostable multivibrator coupled to said AND gate, said second monostable multivibrator generating a second pulse if said prefire signal is received while first pulse is active.

8. The weld controller defined by claim 6 wherein said firing signal generating means comprises a first and second output driver coupled to said first and second monostable multivibrators and adapted to generate said firing signal for input to said welder power module, said firing signal having a positive component and a negative component.

9. The weld controller defined by claim 2 wherein said memory means comprises a read only memory coupled to said processor.

* * * * *

UNITED STATES PATENT AND TRADEMARK OFFICE
CERTIFICATE OF CORRECTION

PATENT NO. : 4,945,201
DATED : July 31, 1990
INVENTOR(S) : Ito, et al

It is certified that error appears in the above-indentified patent and that said Letters Patent is hereby corrected as shown below:

The drawing sheet, consisting of Figure 4, should be added as shown on attached page.

Signed and Sealed this

Nineteenth Day of July, 1994

Attest:

BRUCE LEHMAN

Attesting Officer     Commissioner of Patents and Trademarks